April 23, 1946. P. W. THORNHILL 2,398,870
FLUID PRESSURE REMOTE CONTROL SYSTEM
Filed March 10, 1941 2 Sheets-Sheet 1

Inventor
Peter Warborn Thornhill
By M. W. McConkey
attorney

April 23, 1946.  P. W. THORNHILL  2,398,870
FLUID PRESSURE REMOTE CONTROL SYSTEM
Filed March 10, 1941  2 Sheets-Sheet 2
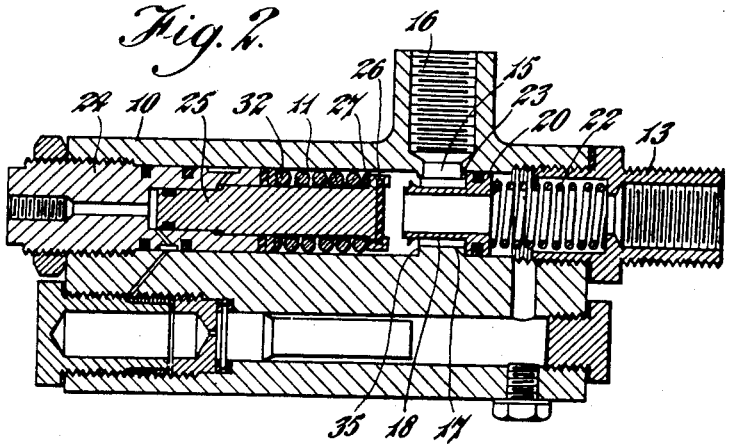
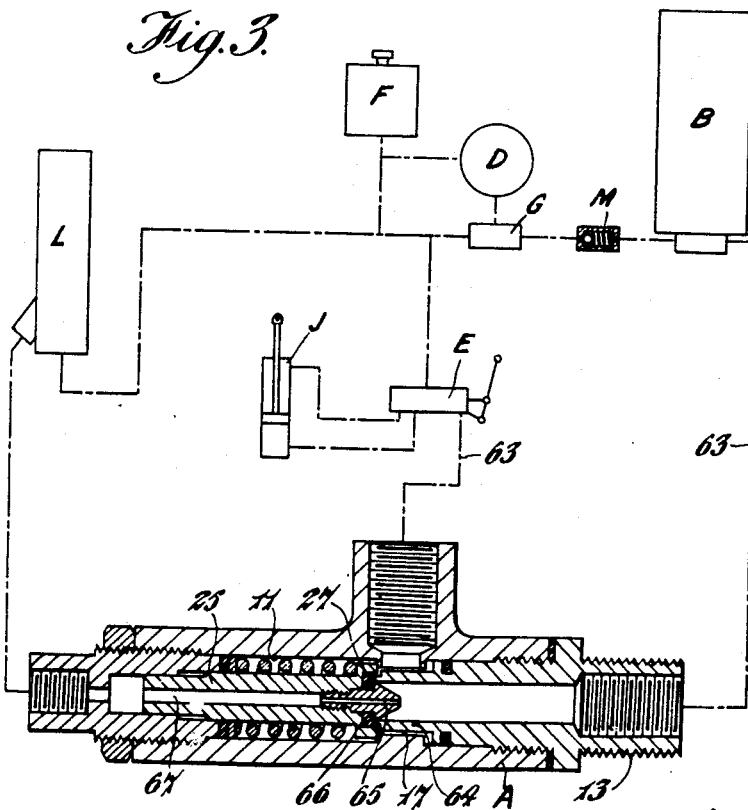
Inventor
Peter Warborn Thornhill
By M. W. McConkey
attorney Patented Apr. 23, 1946

2,398,870

UNITED STATES PATENT OFFICE 2,398,870

FLUID PRESSURE REMOTE-CONTROL SYSTEM

Peter Warborn Thornhill, Leamington Spa, England, assignor to Automotive Products Company Limited, Leamington Spa, England Application March 10, 1941, Serial No. 382,667
In Great Britain March 13, 1940

4 Claims. (Cl. 137—139)

This invention relates to fluid pressure remote control systems of the kind in which one or more motor units is or are operated by fluid pressure generated by a pump and stored in an accumulator, a motor unit to be operated being put into communication with the accumulator by means of a selector valve.

In fluid pressure remote control systems of this kind and particularly when the system includes a relatively large number of motor units or groups of motor units each controlled by a separate selector valve, it is very difficult to ensure that no leakage of the pressure from the accumulator can take place through the selector valve when the system is not operating, and thus there is always a risk that, if the pump is stopped for any length of time, the pressure in the accumulator will fall gradually, and no part of the system can be operated without re-starting the pump.

The object of the present invention is to provide a fluid pressure remote control system in which such leakage can take place only so long as the pressure in the accumulator is above a predetermined limit.

According to one aspect of the invention, a shut-off valve provided in the path of the fluid from the accumulator to the selector valve or selector valves is held open by the pressure in the accumulator so long as that pressure is above a predetermined limit, and closes automatically when the pressure falls below that limit, a manual control being provided to open the valve and permit fluid from the accumulator to pass to the selector valves when the pressure in the accumulator is below the predetermined limit.

According to another aspect of the invention, a valve provided in the path of the fluid from the accumulator to the selector valve or selector valves is subjected to the fluid pressure in the accumulator on differential areas at its two sides so that there is a preponderance of such pressure acting to open the valve, and is acted on by a spring augmenting the closing force thereon to cause the valve to close when the pressure in the accumulator is below a predetermined limit, and wherein the fluid pressure tending to close the valve is adapted to be relieved by opening a manually operated auxiliary valve, to permit the main valve to open when the fluid pressure in the accumulator is below the predetermined limit.

The valve may comprise a stepped plunger having its larger end directly subjected to the pressure in the accumulator, and its smaller end to the pressure in a space connected to the accumulator by a restricted passage, and the plunger may slide in a bore in the valve body connected at one end to the accumulator and having a port intermediate its ends leading to the selector valve, a tubular projection or sleeve being mounted in the bore and extending across the intermediate port to engage a seating on the larger end of the plunger to close the valve.

The tubular sleeve may be slidable in the bore of the valve body, and may have an enlarged end which is a fluid-tight fit therein, the said sleeve being urged towards the plunger by a spring, and thereby acting as a non-return valve to permit the accumulator to be charged therethrough.

The invention is hereinafter described with reference to the accompanying drawings, in which:

Figure 2 is a view of the shut-off valve in another position; and

Figure 3 is a view of a modified shut-off valve incorporated in a somewhat different remote control system, the other features of the system being shown diagrammatically.

Figure 1:
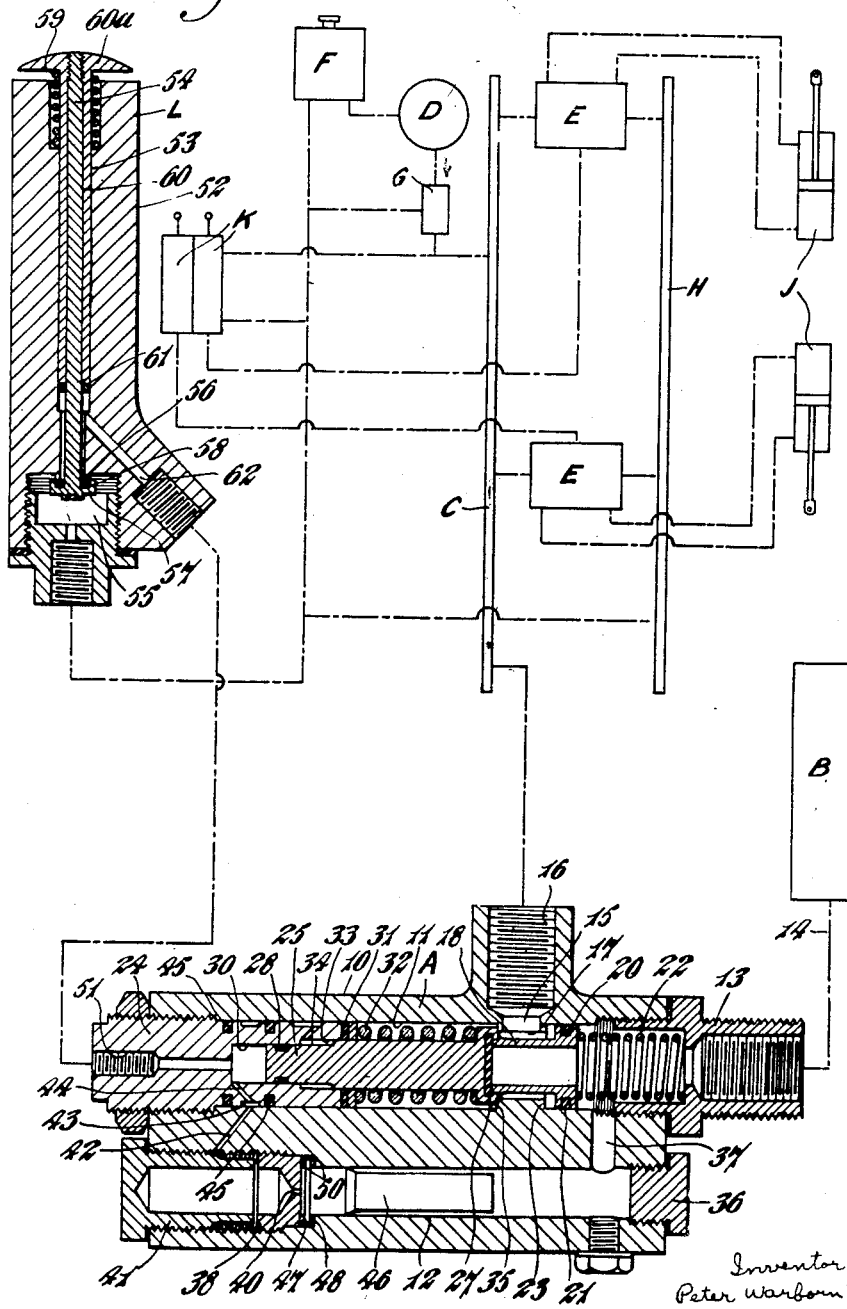
Figure 1 is a diagrammatic illustration of a liquid pressure remote control system incorporating the invention, the shut-off valve and manually operated valve being shown in detail.

Referring to Figures 1 and 2, the shut-off valve A is mounted between an accumulator B and a trunk pipe-line C to which both the pump D and the selector valves E, E are connected, the valve A being arranged to permit the entry of fluid into the accumulator B from the pipe-line C at any time when the pressure in the latter is above that in the former.

The invention is illustrated in Figure 1 as applied to a liquid pressure remote control system such as that described in my United States patent application Serial No. 364,942, for installation on an aircraft for the purpose of operating the retractable undercarriage jacks, the jacks for the flaps, and other motor units for various purposes. In this system, the pump D conveniently driven from one of the aircraft engines, delivers liquid supplied to it from a reservoir F to the trunk pipe-line C, through a cut-out valve G of known construction. A return trunk pipe-line H is also provided, and each of the various jacks and other motor units J, J has its two ends connected to one of the selector valves E, E which are also connected to the two trunk pipe-lines C and G, the arrangement being such that either end of any motor unit J can be connected to either of the two trunk pipe-lines, so that one end of the motor unit receives a supply of pressure liquid and the other can exhaust through the return trunk pipe-line to the reservoir. The motor units can thus be caused to move in either direction by manipulation of the selector valves, which may be so arranged that one end of each motor unit is constantly connected to the pressure trunk pipe-line, or may be arranged so that except when a motor unit is being actuated it is cut off from both trunk pipe-lines. The selector valves are preferably remotely operated hydraulically by the manual actuation of valves K, K as described in my United States patent application above-mentioned, or in any other convenient manner.

The hydraulic accumulator B is connected to the pressure trunk pipe-line C. The pressure in this accumulator B is built up by the action of the pump D, and it provides a store of energy which may be used to operate the various motor units when the pump is not working, or to enable liquid under pressure to be delivered to the motor units at a higher rate than it is delivered by the pump, thus enabling a relatively small pump to be used although a large volume of liquid is required to operate certain of the motor units. In the connection between the trunk pipe-line C and the accumulator B is interposed the shut-off valve A which constitutes the principal feature of this invention. The valve comprises a body 10 formed with two longitudinal bores 11 and 12, the former of which is threaded at one end to receive a union 13 into which is fitted a pipe 14 leading to the accumulator. A port 15 intermediate the ends of the bore 11 leads into a threaded hollow boss 16 connected to the trunk pipe-line, the port 15 opening into a short reduced portion 17 of the bore 11 on the valve body. Within the bore 11 is slidable an externally stepped sleeve 18 having its large end 20 a sliding fit in the end of the bore 11 adjacent the accumulator connection, whilst its smaller portion extends with considerable clearance, through the reduced part 17 of the bore. A sealing ring 21 mounted in the larger end 20 of the sleeve makes a liquid-tight joint between it and the bore 11. A relatively light spring 22 tends to urge the sleeve 18 towards a position in which its larger end 20 rests on the shoulder 23 formed by the adjacent end of the reduced part 17 of the bore 11.

The opposite end of the bore 11 is threaded to receive a plug 24 in which is formed a stepped bore coaxial with the bore in the valve body and with its larger part at the inner end of the plug. In this bore slides a stepped plunger 25 having at its inner end an enlarged head 26 the end face of which is recessed to receive an annular seating washer 27. A sealing ring 28 on the smaller part of the plunger 25 forms a liquid-tight joint with the smaller part 30 of the bore in the plug 24, and a second sealing ring 31 clamped against the inner end of the plug 24 by a spring 32 mounted between it and the enlarged head 26 of the plunger, forms a seal between the large part of the plunger and the larger part 33 of the bore in the plug, at the same time forming a seal between the plug and the valve body. The space 34 between the two seals is connected to the atmosphere. The spring 32 acting on the head 26 of the plunger urges it towards the right in Figure 1, its movement in this direction being limited by engagement of the head 26 with the shoulder 35 at the adjacent end of the reduced part 17 of the bore 11. The plunger 25 and the hollow sleeve 18 are thus urged towards each other by their respective springs 32 and 22, and the end of the sleeve is adapted to engage with the seating washer on the plunger, thus closing the connection between the accumulator and the trunk pipe-line. The smaller part of the sleeve 18 is somewhat longer than the reduced part 17 of the bore, to allow such engagement to take place. The spring 32 is of greater strength than the spring 22, so that the head of the plunger 25 is held against the shoulder 35 in the absence of other forces acting on the valve.

The second bore 12 in the body 10 is closed at the end nearer to the accumulator connection by a plug 36, and is connected at this end by a transverse passage 37 to the bore 11 to the right of the sleeve 18, so that the bore 12 is permanently open to the pressure in the accumulator. At the opposite end, the bore 12 is enlarged, and threaded to receive a plug 38 through which is formed a restricted passage 40. A further plug 41 closes the end of the bore, the plug 41 being spaced slightly from the plug 38 to permit the space at the left-hand side of the latter to connect with a passage 42 leading to the bore 11, where it opens into an annular groove 43 in the plug 24, from which another passage 44 leads into the smaller diameter part 30 of the bore of the plug 24. Sealing rings 45—45 prevent fluid from passing along the bore 11 from the groove 43. In the bore 12 is mounted a filter unit 46 of any convenient type, the unit having a flanged base 47 by means of which it is clamped in position between the plug 38 and a shoulder 48 in the bore, sealing rings 50—50 being interposed to make a fluid-tight joint. The smaller part 30 of the bore in the plug 24 is thus in constant communication, through the restricted orifice 40, with the accumulator.

From the interior of the plug 24 a passage 51 leads to a manually controlled valve L connected by a pipe-line to the reservoir of the system. The manually controlled valve L comprises a generally cylindrical body 52 drilled through at 53 to receive a valve stem 54 and having a recess 55 at one end into which the through passage 53 opens, a lip 56 being formed at the opening of the passage 53 into the recess 55. The valve stem 54 carries a head 57 lying in the recess 55, on which head is mounted a seating washer 58, and a spring 59 acting on the valve stem tends to hold the washer 58 against the lip 56. The stem 54 is secured in a sleeve 60 on the outer end of which is formed a push-button 60a, and a sealing ring 61 on the inner end of the sleeve has an area equal to the seating area of the valve head 57, so that the valve is balanced against fluid pressure acting on it in the opening direction. A branch 62 from the through passage 53, between the head 57 and the seal 61 is connected to the passage 51, and the recess 55 is connected to the reservoir F. The manually controlled valve can therefore be opened by a thrust on the stem 54 to permit liquid to escape to the reservoir, and the force required to open it is unaffected by the pressure in the system.

When the system is in operation, the accumulator B is charged with liquid by the pump D which delivers liquid into the trunk pipe-line C through the cut-out valve G until the pressure in the former reaches the limit for which the cut-out valve is set, this limit being, for example 3,000 lbs. per square inch. The pressure in the trunk pipe-line C acts on the sleeve 18 of the shut-off valve to move it against its loading spring 22, and thus moves it away from the seating washer 27 on the plunger 25, to permit liquid to enter the accumulator B, but as soon as the cut-out valve operates, and the pressure in the trunk pipe-line C ceases to rise, the pressure on the two ends of the sleeve is equalized, and it returns towards the plunger under the influence of its spring 22. Due to its differential area, the plunger 25 has a tendency to move against its spring 32 under the pressure in the accumulator, and the spring load on it is so adjusted that the plunger moves when subjected to a pressure above a given limit, e. g. 2,000 lbs. per square inch, which is below the normal working range of the system. It will thus be seen that so long as the accumulator B is charged to a pressure above 2,000 lbs. per square inch or whatever the selected pressure may be, the plunger 25 will be held away from the sleeve 18, which is prevented from following it towards the left by the shoulder 23, and liquid can flow freely out of the accumulator into the trunk pipe-line to operate the various motor units. Should the pressure fall below 2,000 lbs. per square inch, however, due to leakage or from any other cause, the plunger 25 moves forward and the seating washer 27 engages the end of the sleeve 18, thus preventing further liquid from escaping from the accumulator, although, if the pressure is greater in the trunk pipe-line than in the accumulator, liquid can always flow into the accumulator whatever the actual pressures may be, by forcing back the sleeve 18.

If, due to leakage of liquid whilst the pump D is stopped, the pressure in the accumulator B has fallen sufficiently for the plunger 25 to move inwardly and close the connection to the trunk pipe-line C, and it is desired to operate one of the jacks J without restarting the pump, the manually controlled valve L is operated by pressing on the button 60a to move the stem 54 inwardly, and push the valve head 57 away from the lip 56, thus connecting the interior of the plug 24 in the shut-off valve to the reservoir F. The accumulator pressure, which reaches the interior of the plug through the restricted orifice 40 in the plug 38 and acts on the left-hand end of the plunger 25, of course assists the spring 32 to hold the plunger in its inward position. The opening of the manually controlled valve L relieves the pressure on the left-hand end of the plunger, so that the pressure on its right-hand end has only to overcome the load of the spring 32, and the plunger 25 moves back, thus permitting liquid to flow from the accumulator B into the trunk pipe-line C, and so to any of the jacks J through the respective selector valve E. The restricted passage 40 through the plug 38 prevents any appreciable quantity of liquid from escaping through the manually controlled valve to the reservoir, and ensures the maintenance of a sufficient pressure difference across the plunger to hold it in the withdrawn position until the manually controlled valve is again closed.

In Figure 1, the parts of the shut-off valve A are shown in the positions which they occupy when the accumulator pressure is below the predetermined limit, and the manually controlled valve L is closed. In Figure 2 the position is that existing when the accumulator B is substantially fully charged, and the cut-out valve G has operated to connect the pump D directly to the reservoir, or when the manually controlled valve L has been opened whilst the pressure in the accumulator is below the predetermined limit. It is clearly seen that in the former case the accumulator is completely isolated from the trunk line C, whilst in the latter case the two are connected.

Figure 3 shows a somewhat modified form of the invention, in which an accumulator B receives liquid from a pump D through a cut-out valve G and a non-return valve M, the shut-off valve A being connected in a pipe-line 63 between the accumulator B and a selector valve E, shown in this case as a directly manually operated valve.

The shut-off valve device A in this case is slightly modified, the sleeve 18 being omitted, and replaced by an extension of the plug 13 to form a fixed tubular projection 64 extending through the reduced portion 17 of the bore 11 in the valve body. The plunger 25 carries a seating washer 27 which engages the end of this tubular projection, and so closes the passage from the accumulator to the selector valve. In the arrangement shown, the filter 46 of Figure 1 has been omitted, and the restricted connection between the accumulator B and the interior of the plug 24 is provided by a fine-bore passage 65 through a nipple 66 screwed into the end of a passage 67 through the plunger 25, the nipple 66 being shouldered to engage the seating washer 27 and hold it firmly in place. The interior of the plug is connected as before to the manually controlled valve L.

In this modification of the invention, the accumulator is not charged through the valve A, and so the sliding sleeve 18 is not necessary. The plunger 25 is held off the end of the projection 64 so long as the pressure in the accumulator is above that chosen as the closing pressure for the valve, and seats on the projection when the pressure falls below that limit. If, however, when the pressure is below the chosen limit, it is desired to operate the jack J, the manually-operated value L is opened, and the pressure behind the plunger 25 relieved, allowing the plunger to move away from the projection and permit fluid to flow to the selector valve E and so to the jack J.

Whilst the invention has been described as applied to a liquid pressure remote control system employed on an aircraft, it may be applied to remote control systems for other purposes in which the operating fluid is either a liquid or a gas. The invention provides a reserve of pressure in the system which may confidently be relied on to exist for an indefinite period during which the pump is not working, which reserve of pressure may be utilized to operate one or more motor units during that period. Thus, in a system employed on an aircraft, the reserve pressure may be used to operate various motor units whilst the aircraft is on the ground with its engines stationary, or to keep the various controls in operation if the pump should fail during flight.

What I claim is:

1. In a fluid pressure remote control system; a shut-off valve comprising a valve body having a bore with a first reduced portion intermediate its ends; a port in communication with said bore intermediate the ends of said reduced portion; a second port in communication with one end of the bore, a sleeve of less external diameter and greater length than the corresponding dimensions of said reduced portion slidable in the bore and having an enlarged end fitting fluid tight within the bore adjacent said one end; a stepped plunger reciprocable in the other end of the bore having its larger end adapted to engage one end of the sleeve and when so engaged shutting off communication between the ports, the smaller end of the plunger being in fluid tight relationship with a space at the other end of said bore; a first and a second spring respectively engaging the sleeve and the plunger urging the plunger and sleeve into engagement; means forming restricted communication between the bore adjacent said second port and said space to normally equalize the pressure acting on the ends of the plunger; the ends of said reduced portion of the bore forming stops for limiting movement of the plunger and sleeve; the arrangement being such that when the pressure at the first port exceeds that in the second port by a predetermined amount the sleeve is moved out of engagement with the plunger and when the pressure at the second port is above a predetermined value the plunger is moved out of engagement with the sleeve; and venting means in communication with the space arranged to relieve the pressure in the space; the areas of the stepped plunger and the tension of the second spring being such that the plunger will move away from the sleeve when the pressure in the space is relieved.

2. A shut-off valve for a fluid pressure system comprising a bore having a reduced portion therein, a union in one end of said bore having a port therein connecting with said bore, a plug in the other end of said bore having a stepped bore therein, a passage connecting said stepped bore and adapted to release the pressure therein, a port intermediate the ends of the bore and terminating in said reduced portion in said bore, means within said bore extending axially in said bore beyond said intermediate port and forming a valve seat, a plunger having a reduced end slidable in said stepped bore and an expanded end in said bore, said plunger being spring urged towards said means, the expanded end of said plunger being adapted to cooperate with said valve seat to cut off communication between said first and second named ports, sealing means between said plunger and said stepped bore, a passage having a restriction therein connecting said stepped bore and said bore to normally equalize the pressure acting on the ends of said plunger, the ends of said plunger forming differential areas on which fluid pressure acts to thereby cause said plunger to shift in said bore to open and close communication between said ports, said plunger being adapted to move to open position when the pressure in said stepped bore acting on the reduced end of said plunger is released through said first named passage.

3. A shut-off valve for a fluid pressure system comprising a body portion having a bore with a reduced portion therein, a port terminating in the reduced portion of said bore, a second port in one end of said bore, a spring urged sleeve reciprocable in said bore and responsive to pressure in said first named port and adapted to establish communication between said ports, said sleeve being spring urged to closed position to cut off communication between said ports at times, a stepped plunger reciprocable in said bore and having a reduced end and an expanded end the latter of which engages said sleeve, a spring urging said plunger toward said sleeve, said plunger being adapted to open communication between the ports at times when said sleeve is in closed position, a stepped bore in the end of the bore opposite said second port in which stepped bore the reduced end of said plunger slides, a restricted passage connecting the end of the bore adjacent the second port to the reduced end of said bore, said restricted passage communicating the pressure within the bore adjacent said second port which is acting on the expanded end of the plunger to the reduced end of the plunger to thereby hold said plunger in closed position, a passage connecting said stepped bore which is adjacent the reduced end of said plunger for releasing the pressure acting on said reduced end to cause said plunger to move to open position, whereby communication is established between the ports.

4. A shut-off valve for a fluid pressure system comprising a bore having a reduced portion therein, a port intermediate the ends of the bore and terminating in said reduced portion, a union in one end of said bore having a port therein, a reduced portion integral with said union and protruding axially into said bore beyond said intermediate port, a valve seat formed in the reduced portion of said union beyond the intermediate port, a plug with a stepped bore therein in the other end of said bore, a plunger having a reduced portion slidable in said stepped bore and an expanded portion extending into said bore and adapted to cooperate with said valve seat to control communication between said ports, said plunger being spring biased to closed position against said seat, a restricted passage connecting the ends of said plunger for communicating the pressure in said second named port acting on the expanded end of said plunger to the reduced end of said plunger to urge said plunger to closed position, and means for releasing the pressure on the reduced end of said plunger to cause said plunger to move to open position to establish communication between said ports.

PETER WARBORN THORNHILL.